United States Patent [19]

Wiedermann et al.

[11] 4,246,365
[45] Jan. 20, 1981

[54] PROCESS FOR THE PRODUCTION OF PLASTICS CONTAINING ISOCYANURATE GROUPS AND URETHANE GROUPS

[75] Inventors: Rolf Wiedermann, Bergisch-Gladbach; Rudolf Merten, Leverkusen; Werner Dietrich, Cologne; Wolfgang Schmitz, Leverkusen, all of Fed. Rep. of Germany

[73] Assignee: Bayer Aktiengesellschaft, Leverkusen, Fed. Rep. of Germany

[21] Appl. No.: 861

[22] Filed: Jan. 4, 1979

Related U.S. Application Data

[63] Continuation-in-part of Ser. No. 820,672, Aug. 1, 1977, abandoned.

[30] Foreign Application Priority Data

Aug. 18, 1976 [DE] Fed. Rep. of Germany ....... 2637170

[51] Int. Cl.³ .............................................. C12N 15/00
[52] U.S. Cl. .................... 521/172; 521/902; 528/80
[58] Field of Search .................. 521/902; 172; 528/80

[56] References Cited

U.S. PATENT DOCUMENTS

| 3,135,711 | 6/1964 | Thoma et al. ...................... 260/30.4 |
| 3,284,413 | 11/1966 | Heiss ............................. 260/77.5 NC |
| 3,442,830 | 5/1969 | Thomas ......................... 260/2.5 AN |
| 3,803,098 | 4/1974 | Schmitt et al. ............... 260/77.5 NC |
| 4,026,837 | 5/1977 | Zimmerman et al. ......... 260/2.5 AB |
| 4,039,487 | 8/1977 | Kolakowski et al. ................ 521/902 |

FOREIGN PATENT DOCUMENTS 1108013 3/1968 United Kingdom .

Primary Examiner—Lewis T. Jacobs
Attorney, Agent, or Firm—Gene Harsh; Joseph C. Gil; R. Brent Olson

[57] ABSTRACT

The present invention is directed to a method for the production of plastics, including foams, containing urethane groups and predominantly isocyanurate groups by reacting polyesters having a molecular weight of from 350 to 10,000, and containing at least two hydroxyl groups and containing phthalic acid residues and, optionally, other polyhydroxyl compounds having a molecular weight of from 400 to 10,000 and/or chain extenders having a molecular weight of from 32 to 400 with an excess of polyisocyanates in the presence of isocyanate-trimerization catalysts and optionally blowing agents, foam stabilizers and other additives, the improvement characterized in that polyesters are used whose acid components comprise at least 50%, by weight, phthalic acid residues and wherein 10 to 49%, preferably 20 to 40%, by weight, of the isocyanate groups react to form urethane groups and 51 to 90%, preferably 60 to 80%, by weight, of the isocyanate groups react to form isocyanurate groups.

4 Claims, No Drawings

PROCESS FOR THE PRODUCTION OF PLASTICS CONTAINING ISOCYANURATE GROUPS AND URETHANE GROUPS

This application is a continuation-in-part of our co-pending application Ser. No. 820,672 filed Aug. 1, 1977 now abandoned.

BACKGROUND OF THE INVENTION

The production of plastics containing isocyanurate groups and urethane groups by reacting polyesters containing at least two hydroxyl groups and phthalic acid residues with an excess of polyisocyanates in the presence of trimerization catalysts is known.

Thus, a mixture of various esters which contain phthalic acid residues are used for the production of foams containing isocyanurate groups in accordance with the teaching of the German Pat. No. 1,112,285 (cf. Example 13). However, the proportion of phthalic acid in the carboxylic acids, which are used for the production of the esters, is below 50%, by weight, in this case.

The use of polyesters which only contain small quantities of phthalic acid residues for the production of plastics containing isocyanurate groups is also disclosed in German Offenlegungsschrift No. 1,769,023. The production of a foam containing isocyanurate groups from these polyesters, having a phthalic acid residue content of below 50%, by weight, is again described in German Offenlegungsschrift No. 1,794,117.

DESCRIPTION OF THE INVENTION

Surprisingly, it was found that a clear improvement in the burning properties of plastics containing isocyanurate groups is achieved by reacting polyesters having a phthalic acid residue content of above 50%, by weight, based on the total amount of carboxylic acids used, with an excess of polyisocyanates.

It was known that the burning properties of plastics containing isocyanurate groups and urethane groups could also be improved by the use of halogen-containing polyesters, such as tetrabromophthalic acid esters or HET acid esters; but this has the drawback of a greater evolution of smoke gas occurring in the case of combustion.

By using polyesters which are derived from carboxylic acids which contain more than 50%, by weight, of phthalic acid residues as acid component in accordance with the present invention, it is possible to produce plastics having good fire retardant properties and little development of smoke gas.

The present invention relates to a process for the production of plastics, including foams, containing urethane groups and predominately isocyanurate groups, by reacting polyesters derived from carboxylic acids containing more than 50% by weight of phthalic acid residue having a molecular weight of from 350 to 10,000 and containing at least two hydroxyl groups, and optionally other polyhydroxyl compounds having a molecular weight of from 400 to 10,000 and/or chain extenders having a molecular weight of from 32 to 400, with an excess of polyisocyanates in the presence of isocyanate trimerization catalysts and, optionally, blowing agents, foam stabilizers and other additives, characterized by the use of a polyester wherein the acid component comprises at least 50%, by weight, preferably at least 70%, by weight, of phthalic acid residues and wherein 10 to 49%, preferably 20 to 40%, by weight, of the isocyanate groups react to form urethane groups and 51 to 90%, preferably 60 to 80%, by weight, of the isocyanate groups react to form isocyanurate groups. By phthalic acid residue is meant the grouping

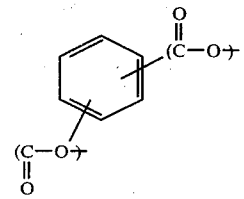

The production of foams is preferred according to the present invention.

The present invention also relates to plastics, including foams, containing urethane and predominantly isocyanurate groups, which may be obtained by the process according to the present invention.

The starting components used according to the present invention include aliphatic, cycloaliphatic, araliphatic, aromatic and heterocyclic polyisocyanates, such as those described, for example, by W. Siefken in Justus Liebigs Annalen der Chemie, 562, pages 75 to 136. Examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and 1,4-diisocyanate and mixtures of these isomers; 1-isocyanato-3,3,5-trimethyl-5-isocyanatomethylcyclohexane (German Auslegeschrift No. 1,202,785, U.S. Pat. No. 3,401,190); hexahydrotolylene-2,4- and- 2,6-diisocyanate and mixtures of these isomers; hexahydrophenylene-1,3- and/or -1,4-diisocyanate; perhydrodiphenylmethane-2,4'- and/or 4,4'-diisocyanate; phenylene-1,3- and -1,4-diisocyanate; tolylene-2,4- and -2,6-diisocyanate and mixtures of these isomers; diphenylmethane-2,4'- and/or -4,4'-diisocyanate; naphthylene-1,5-diisocyanate; triphenyl methane-4,4',4"-triisocyanate; polyphenyl-polymethylene polyisocyanate which may be obtained by aniline/formaldehyde condensation followed by phosgenation and which have been described, for example, in British Pat. Nos. 874,430 and 848,671; m- and p-isocyanatophenyl sulphonyl isocyanate according to U.S. Pat. No. 3,454,606; perchlorinated aryl polyisocyanate as described, for example, in U.S. Pat. No. 3,277,138; polyisocyanates containing carbodiimide groups as described in U.S. Pat. No. 3,152,162; the diisocyanates described in U.S. Pat. No. 3,492,330; polyisocyanates containing allophanate groups as described, for example, in British Pat. No. 994,890, Belgian Pat. No. 761,626 and Published Dutch Patent application No. 7,102,524; polyisocyanates containing isocyanurate groups as described, for example, in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups as described, for example, in Belgian Pat. No. 752,261 or in U.S. Pat. No. 3,394,164; polyisocyanates containing acrylated urea groups according to German Pat. No. 1,230,778; polyisocyanates containing biuret groups as described, for example, in U.S. Pat. Nos. 3,124,605 and 3,201,372; and in British Pat. No. 889,050; polyisocyanates prepared by telomerization reactions as described, for example, in U.S. Pat. No. 3,654,016; polyisocyanates containing ester groups as mentioned, for example, in British Pat. Nos. 965,474 and 1,072,956, in U.S. Pat. No.

3,567,763 and in German Pat. No. 1,231,688; reaction products of the above-mentioned isocyanates with acetals according to German Pat. No. 1,072,385; and, polyisocyanates containing polymeric fatty acid groups as described in U.S. Pat. No. 3,455,883.

The distillation residues obtained from the commercial production of isocyanates and which still contain isocyanate groups may also be used, optionally dissolved in one or more of the above-mentioned polyisocyanates. Mixtures of the above-mentioned polyisocyanates may also be used.

The polyisocyanates which are readily available are generally preferred, for example, tolylene-2,4- and -2,6-diisocyanate and mixtures of these isomers ("TDI"); polyphenyl polymethylene polyisocyanates which may be obtained by aniline/formaldehyde condensation followed by phosgenation ("crude MDI"); and, polyisocyanates containing carbodiimide groups, urethane groups, allophanate groups, isocyanurate groups, urea groups or biuret groups ("modified polyisocyanates").

Starting components used according to the present invention also include polyesters containing at least two hydroxyl groups, as a rule having a molecular weight of from 350 to 10,000, in particular polyesters containing from 2 to 8 hydroxyl groups, preferably those having a molecular weight of from 400 to 5000, more preferably from 400 to 2000, wherein the acid component of these polyesters comprise at least 50%, by weight, preferably at least 70%, by weight, of phthalic acid residues.

These polyesters containing hydroxyl groups include for example, reaction products of polyhydric, preferably dihydric and optionally trihydric, alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. o-phthalic acids, isophthalic acids and/or terephthalic acids may be used as the phthalic acid. The optional polybasic-carboxylic acids may be aliphatic, cycloaliphatic, aromatic and/or heterocyclic and may be substituted, for example, with halogen atoms and/or may be unsaturated. The following are mentioned as examples: succinic acid, adipic acid, suberic acid, azelaic acid, sebacic acid, trimellitic acid, tetrahydrophthalic acid anhydride, hexahydrophthalic acid anhydride, endomethylene tetrahydro phthalic acid anhydride, glutaric acid anhydride, maleic acid, maleic acid anhydride, fumaric acid, dimeric and trimeric fatty acids, such as oleic acid, optionally mixed with monomeric fatty acids. Suitable polyhydric alcohols include, for example, ethylene glycol, propylene glycol-(1,2) and -(1,3), diol-(1,8), neopentyl glycol, cyclohexane dimethanol (1,4-bis-hydroxymethylcyclohexane), 2-methyl-1,3-propane diol, glycerol, trimethylolpropane, hexanetriol-(1,2,6) butane triol-(1,2,4), trimethylolethane, pentaerythritol, quinitol, mannitol and sorbitol, methylglycoside, also diethylene glycol, triethylene glycol, tetraethylene glycol, polyethylene glycols, dipropylene glycol, polypropylene glycols, dibutylene glycol, and polybutylene glycols. The polyesters may also contain carboxyl end groups. Polyesters of lactones, such as $\epsilon$-caprolactone, or hydroxycarboxylic acids, such as $\omega$-hydroxycaproic acid, may also be used.

According to the present invention, polyethers containing at least one, generally from 2 to 8, preferably 2 or 3, hydroxyl groups and having a molecular weight of from 400 to 10,000 of known type may be used. These are prepared, for example, by the polymerization of epoxides, such as ethylene oxide, propylene oxide, butylene oxide, tetrahydrofuran, styrene oxide, or epichlorohydrin, either on its own for example in the presence of $BF_3$, or by chemical addition of these epoxides, optionally as mixtures or successively, to starting components having reactive hydrogen atoms, such as alcohols or amines, for example water, ethylene glycol, propylene glycol-(1,3) or -(1,2), trimethylol propane, 4,4'-dihydroxy diphenylpropane aniline, ammonia, ethanolamine or ethylene diamine. Sucrose polyethers which have been described, for example in German Auslegeschrift Nos. 1,176,358 and 1,064,938 may also be used according to the present invention. It is frequently preferred to use polyethers which contain predominantly primary OH groups (up to 90%, by weight, based on all the OH groups present in the polyether). Polyethers which have been modified with vinyl polymers, for example, the compounds obtained by the polymerization of styrene and acrylonitrile in the presence of polyethers (U.S. Pat. Nos. 3,383,351; 3,304,273; 3,523,093 and 3,110,695 and German Pat. No. 1,152,536) are also suitable as are polybutadienes containing OH groups.

Among the corresponding polythioethers which may also be used, the condensation products obtained from thiodiglycol on its own and/or with other glycols, dicarboxylic acids, formaldehyde, aminocarboxylic acids or aminoalcohols should be particularly mentioned. The products obtained are polythio mixed ethers, polythio ether esters or polythio ether ester amides, depending on the co-components.

Suitable polyacetals which may optionally be used include, for example, the compounds which may be obtained from glycols, such as diethylene glycol, triethylene glycol, 4,4'-dioxethoxy-diphenyldimethyl methane or hexane diol, and formaldehyde. Polyacetals suitable for the purposes of the present invention may also be prepared by polymerizing cyclic acetals.

Suitable polycarbonates containing hydroxyl groups having a molecular weight of from 400 to 10,000 are known and may be prepared, for example, by the reaction of diols, such as propane diol-(1,3), butane diol-(1,4), and/or hexane diol-(1,6), diethylene glycol, triethylene glycol or tetraethylene glycol, with diaryl carbonates, for example, diphenyl carbonate, or with phosgene.

Polyhydroxyl compounds already containing urethane or urea groups and modified or unmodified natural polyols, such as castor oil, carbohydrates or starch may also be used. Addition products of alkylene oxides and phenyl/formaldehyde resins or of alkylene oxides and urea/formaldehyde resins are also suitable according to the present invention.

Representatives of these compounds which may be used according to the present invention have been described, for example, in High Polymers, Volume XVI, "Polyurethanes, Chemistry and Technology", by Saunders and Frisch, Interscience Publishers, New York, London, Volume I, 1962, pages 32–42 and pages 44 to 54 and Volume II, 1964, pages 5 and 6 and 198–199, and in Kunststoff-Handbuch, Volume VII, Vieweg-Hochtlen, Carl-Hanser-Verlag, Munich 1966, for example, on pages 45 to 71.

If mixtures of the above-mentioned compounds containing at least two hydrogen atoms capable of reacting with isocyanates and having a molecular weight of from 400 to 10,000, for example mixtures of polyethers, are used with polyesters according to the present invention, the polyesters should be present in an amount of at least 50%, by weight.

The starting components according to the present invention may also include compounds having a molecular weight of from 32 to 400 containing at least one OH group. The following are mentioned as examples of such compounds: methanol, ethanol, n-hexanol, octanol, ethylene glycol, propylene glycol-(1,2) and -(1,3), butylene glycol-(1,4) and -(2,3), pentane diol-(1,5), hexane diol-(1,6), octane diol-(1,8), neopentyl glycol, 1,4-bis-hydroxymethylcyclohexane, 2-methyl-1,3-propane diol, glycerol, trimethylolpropane, hexanetriol-(1,2,6), trimethylolethane, pentaerythritol, quinitol, mannitol, sorbitol, diethylene glycol, trimethylene glycol, tetraethylene glycol, polyethylene glycols having a molecular weight of up to 400, dipropylene glycol, polypropylene glycols having a molecular weight of up to 400, 4,4'-dihydroxy-diphenylpropane, dihydroxy-methylhydroquinone, ethanolamine, diethanolamine, triethanolamine and 3-aminopropanol.

Here again, mixtures of various compounds containing at least one OH group and having a molecular weight of from 32 to 400 may be used; in this case also at least 50%, by weight, polyester should be used according to the present invention.

According to the present invention, water and/or readily volatile organic substances may be used as blowing agents. Suitable organic blowing agents include, for example, acetone, ethyl acetate, halogenated alkanes, such as methylene chloride, chloroform, ethylidene chloride, vinylidene chloride, monofluorotrichloromethane and chlorodifluoromethane, also butane, hexane, heptane or diethylether. The effect of a blowing agent may also be obtained by adding compounds which decompose at temperatures above room temperature to liberate gases, such as nitrogen, for example, azo compounds, such as azoisobutyric acid nitrile. Other examples of blowing agents and details about the use of blowing agents may be found in Kunststoff-Handbuch, Volume VII, published by Vieweg-Hochtlen, Carl-Hanser-Verlag, Munich, 1966, for example, on pages 108 and 109, 453 to 455 and 507 to 510.

Compounds which readily initiate a polymerization reaction of the NCO-groups at temperatures as low as room temperature are used as catalysts for polymerization. Compounds of this type are described, for example, in French Pat. No. 1,441,565, Belgian Pat. Nos. 723,153 and 723,152 and German Pat. No. 1,112,285.

Such catalysts are, in particular mononuclear or polynuclear Mannich bases of condensable phenols, oxo-compounds and secondary amines which are optionally substituted with alkyl groups, aryl groups or aralkyl groups, preferably those in which formaldehyde is used as the oxo-compound and dimethylamine as the secondary amine. More or less large proportions of carbodiimide structures generally occur in the forms, as shown by IR spectroscopy, depending on conditions, especially the reaction temperature attained.

Other suitable catalysts are the salts of the alkali metals or alkaline earth metals of carboxylic acids and phenols. The quantity of polymerization catalysts is essentially determined by the type (and if necessary the basicity) of the catalysts; from 0.1 to 100%, by weight, preferably from 0.3 to 25%, by weight, of catalyst in relation to the isocyanate may be used.

According to the present invention, the conventional catalysts may be used for the polyurethane reaction, for example, tertiary amines, such as triethylamine, tributylamine, N-methyl morpholine, N-ethyl-morpholine, N-coco-morpholine, N,N,N',N'-tetramethyl-ethylenediamine, 1,4-diaza-bicyclo-(2,2,2)-octane, N-methyl-N'-dimethyl aminoethyl-piperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-$\beta$-phenylethylamine, 1,2-dimethylimidazole and 2-methylimidazole. The known Mannich Bases obtained from secondary amines, such as dimethylamine, and aldehydes, preferably formaldehyde, or ketones, such as acetone, methyl ethyl ketone or cyclohexanone, and phenols, such as phenol, nonylphenol, or bis-phenol, may also be used as catalysts.

Tertiary amines containing isocyanate-reactive hydrogen atoms used as catalysts include, for example, triethanolamine, triisopropanolamine, N-methyl-diethanolamine, N-ethyl-di-ethanolamine, N,N-dimethylethanolamine and the reaction products thereof with alkylene oxides, such as propylene oxide and/or ethylene oxide.

Silaamines having carbon-silicon bonds as described, for example, in German Pat. No. 1,229,290 (corresponding to U.S. Pat. No. 3,620,984) may also be used as catalysts, for example 2,2,4-trimethyl-2-silamorpholine and 1,3-diethylaminomethyl-tetramethyl-disiloxane.

The catalysts used may also be basic nitrogen compounds, such as tetraalkylammonium hydroxides, alkali metal hydroxides, such as sodium hydroxide, alkali metal phenolates, such as sodium phenolate, or alkali metal alcoholates, such as sodium methylate. Hexahydrotriazines may also be used as catalysts.

According to the present invention, organic metal compounds, in particular organic tin compounds, may be used as catalysts.

Suitable organic tin compounds are preferably tin(II)-salts of carboxylic acids, suchas tin(II)-acetate, tin(II)-octoate, tin(II)-ethylhexoate and tin(II)-laurate, and the tin(IV)-compounds, for example dibutyl tin oxide, dibutyl tin dichloride, dibutyl tin diacetate, dibutyl tin dilaurate, dibutyl tin maleate or dioctyl tin diacetate. All of the above-mentioned catalysts may be used as mixtures.

Further representatives of catalysts which may be used according to the present invention, as well as details on the mode of operation of the catalyst are described in Kunststoff-Handbuch, Volume III, published by Vieweg-Hochtlen, Carl-Hanser-Verlag, Munich 1966, for example, on pages 96 to 102.

The catalysts are generally used in a quantity of from about 0.001 to 10%, by weight, based on the quantity of the polyesters used according to this invention.

According to the present invention, surface-active additives, such as emulsifiers and foam stabilizers, may also be used. Suitable emulsifiers include, for example, the sodium salts of ricinoleic sulphonates, or salts of fatty acids and amines, such as oleic acid diethylamine or stearic acid diethanolamine. Alkali metal or ammonium salts of sulphonic acids, such as dodecyl benzene sulphonic acid or dinaphthylmethane disulphonic acid, or of fatty acids, such as ricinoleic acid, or of polymeric fatty acids may also be used as surface-active additives.

The foam stabilizers used are mainly polyether siloxanes, especially those which are water-soluble. These compounds generally have a polydimethyl siloxane group attached to a copolymer of ethylene oxide and propylene oxide. Foam stabilizers of this type have been described, for example, in U.S. Pat. Nos. 2,834,748; 2,917,480 and 3,629,308.

According to the present invention, it is also possible to use known cell regulators such as paraffins or fatty alcohols or dimethyl polysiloxanes, as well as pigments or dyes and known flame-proofing agents, for example, trischloroethylphosphate, tricresylphosphate or ammonium phosphate or polyphosphate, also stabilizers against ageing and weathering, plasticizers, fungistatic and bacteriostatic substances and fillers, such as barium sulphate, kieslguhr, carbon black or whiting.

Other examples of surface-active additives, foam stabilizers, cell regulators, reaction retarders, stabilizers, flame-proofing substances, plasticizers, dyes, fillers and fungistatic and bacteriostatic substances which may also be used according to the present invention and details concerning the use and action of these additives may be found in Kunststoff-Handbuch, Volume VII, published by Vieweg and Hochtlen, Carl-Hanser-Verlag, Munich 1966, for example on pages 103 and 113.

According to the present invention, the components may be reacted together by the known one-shot process, prepolymer process or semi-prepolymer process, in many cases using mechanical devices, such as those described in U.S. Pat. No. 2,764,565. Details about processing apparatus which may also be used according to the present invention may be found in Kunststoff-Handbuch, Volume VII, published by Vieweg and Hochtlen, Carl-Hanser-Verlag, Munich 1966, for example on pages 121 to 205.

The plastic, including foams, obtained in accordance with the present invention may be used, for example, as insulating materials, in the construction industry or for the commercial sector, or as constructional materials, as well as in the furniture industry.

EXAMPLES

Table 1 shows three foams which were produced by mixing the components manually. In each case, the stirring time amounted to 20 seconds, Foam dimensions: 110×25×25 cm.

Key to Table

Polyester 1: 80%, by weight of phthalic acid 20%, by weight of adipic acid diethylene glycol OH Number 210

Polyester 2: 20%, by weight of phthalic acid anhydride 80%, by weight of adipic acid diethylene glycol OH Number 210

Polyester 3: 100%, by weight of HET acid 50%, by weight of diethylene glycol 50%, by weight of propylene glycol OH Number 270

Amino polyethers of the OH Number 650 produced by adding propylene oxide to ethylene diamine.

TABLE

| Example | 1 | 2 Comparison | 3 Comparison |
|---|---|---|---|
| Polyester 1 parts, by weight | 25 | | |
| Polyester 2 parts, by weight | | 25 | |
| Polyester 3 parts, by weight | | | 25 |
| Glycerine parts, by weight | 2.5 | 2.5 | 2.5 |
| Aminopolyether parts, by weight | 1 | 1 | 1 |
| Polysiloxane-polyether parts, by weight | 1 | 1 | 1 |
| Trichlorethylphosphate parts, by weight | 12 | 12 | 12 |
| Trichlorofluoromethane parts, by weight | 25 | 25 | 25 |

TABLE-continued

| Example | 1 | 2 Comparison | 3 Comparison |
|---|---|---|---|
| 25% K-Acetate solution diethylene glycol parts, by weight | 1.5 | 1.5 | 2 |
| Polymeric 4,4'-diphenylmethane diiscyanate (crude MDI) parts, by weight | 100 | 100 | 100 |
| Gross density (kg/m$^3$) | 33 | 33 | 35 |
| Result of burning test (DIN 4102) | B 1 | B 2 | B 1 |
| Smoke gas density Class in BVD* Test Switzerland. | 3** | 3** | 2 |

*Fire prevention service
**Best class in this test

EXAMPLE 4

Panels are continuously prepared on a one-meter wide double conveyor laminator installation (as sold by Maschinenfabrik Hennecke GmbH, Birlinghoven, Siegkreis, West Germany), whereby 0.2 mm thick textured aluminium foils travel along both sides as surface layers. The foam in the core is formed from the following polyisocyanurate formulation:

Polyol component:
15 parts, by weight, of a polyester of phthalic acid anhydride, adipic acid (weight ratio of the acid components=3:1), diethylene glycol and glycerol (weight ratio of the alcohol components=9:1), hydroxyl number 250.

10 parts, by weight, of a polypropylene oxide (hydroxyl number 400) started on sugar/propylene glycol (1:1).

2 parts, by weight, of octoethylene glycol, 1 part, by weight, of polyether polysiloxane (L 5320 of Union Carbide Co.)

20 parts, by weight, of trichloroethylphosphate.

48 parts, by weight, of these polyol components are mixed with 25 parts, by weight of trichlorofluoromethane, 2.5 parts, by weight, of a 25% potassium acetate solution in diethylene glycol, 0.3 parts, by weight, of dimethylethanolamine and 100 parts, by weight, crude 4,4'-diphenylmethanediisocyanate by means of a high pressure piston engine and carried on the laminator in the conventional manner.

The 3 cm thick panels obtained are tested for their flame resistance.

With the aluminum foil, a classification in the class B 1 is attained according to DIN 4102, the foam itself without a surface layer is classified in the class B 2.

According to the French Epiradiator Classification, the foam is classified in the class M 1.

EXAMPLE 5

For the production of large blocks of polyisocyanurate polyurethane urea foams, it is frequently appropriate to use an NCO-prepolymer instead of a non-modified isocyanate. Tough foams and a uniform expansion process may be achieved in this way.

In order to demonstrate this effect, Example 1 of the Table is referred to, in that firstly a prepolymer is formed from 93 parts, by weight, of the isocyanate (viscosity 200 mPa. sec. at 25° C.; NCO-content 31%) used in Example 1 and 7 parts by weight of the polyester 1 in known manner. Viscosity of the prepolymer: 1000 mPa. sec. at 25° C.; NCO-content: 28%.

During foaming, 107 parts, by weight, of the prepolymer and 18 parts, by weight, of polyester 1 are used.

The burning properties of the foam remain unchanged; the prepolymer foam is however clearly tougher, as shown in the breaking elongation (tensile test according to DIN 53455): according to Example 1: Breaking elongation=6%.

according to Example 5: Breaking elongation=8.5%.

What is claimed is:

1. A method for the production of plastics, including foams, containing urethane groups and predominantly isocyanurate groups by reacting polyesters having a molecular weight of from 350 to 10,000, and containing at least two hydroxyl groups and containing phthalic acid residues and, optionally, other polyhydroxyl compounds having a molecular weight of from 400 to 10,000 and/or chain extenders having a molecular weight of from 32 to 400 with an excess of polyisocyanates in the presence of isocyanate-trimerization catalysts and optionally blowing agents, foam stabilizers and other additives, the improvement characterized in that polyesters are used whose acid components comprise at least 50%, by weight, phthalic acid residues and whose polyhydroxyl component has a hydroxyl equivalent weight of 53 or less, and wherein 10 to 49%, by weight, of the isocyanate groups react to form urethane groups and 51 to 90%, by weight, of the isocyanate groups react to form isocyanurate groups.

2. A method as claimed in claim 1, wherein polyesters are used whose acid component comprises at least 70%, by weight, phthalic acid residues.

3. A method as claimed in claim 1, wherein 20 to 40%, by weight, of the isocyanate groups react to form urethane groups and 60 to 80%, by weight, of the isocyanate groups react to form isocyanurate groups.

4. The method of claim 1 wherein the said polyhydroxyl component is taken from th group consisting of ethylene glycol, propylene glycol-(1,2) and (1,3), neopentyl glycol, 2-methyl-1,3-propane diol, glycerol, trimethylolpropane, hexanetriol-(1,2,6), butanetriol-(1,2,4), trimethylolethane, pentaerythritol, mannitol, sorbitol, methyl glycoside, diethylene glycol, and a mixture thereof.

* * * * *